United States Patent [19]
Eggmann

[11] 3,986,575
[45] Oct. 19, 1976

[54] HYBRID MOTOR UNIT WITH ENERGY STORAGE

[76] Inventor: Ernst Eggmann, 1370 Silverspear Road No. 53, Mississauga, Ontario, Canada

[22] Filed: Mar. 21, 1975

[21] Appl. No.: 560,573

Related U.S. Application Data

[63] Continuation-in-part of Ser. No. 425,689, Dec. 17, 1973, abandoned.

[52] U.S. Cl. .............................. 180/66 B; 60/616; 60/624; 60/712
[51] Int. Cl.² ....................................... B60K 25/00
[58] Field of Search ........... 180/66 B, 54 R; 60/616, 60/618, 615, 614, 624, 712, 628

[56] References Cited
UNITED STATES PATENTS

| | | | |
|---|---|---|---|
| 507,032 | 10/1893 | Neukirch | 60/618 |
| 722,116 | 3/1903 | Lanchester | 60/616 |
| 859,235 | 7/1907 | MacFarren | 180/66 B X |
| 1,013,528 | 1/1912 | Broderick | 60/712 |
| 1,813,543 | 7/1931 | Pescarax | 60/616 |
| 2,090,214 | 8/1937 | Maniscalco | 60/616 |
| 2,256,302 | 9/1941 | Wehmeier | 180/66 B X |
| 2,544,606 | 3/1951 | Mallory | 180/66 B |
| 3,379,008 | 4/1968 | Manganaro | 180/66 B |

*Primary Examiner*—Robert R. Song
*Assistant Examiner*—Milton L. Smith

[57] ABSTRACT

An automotive engine unit comprises an internal combustion engine adapted to meet the power requirements of a vehicle under steady speed running conditions, a hot air turbine unit of higher power output than the internal combustion engine adapted to meet the additional power requirements for accelerating the vehicle, an air compressor driven directly or indirectly by power supplied by the internal combustion engine, and an air storage reservoir. During acceleration of the vehicle, air from the reservoir is fed to the turbine through a heat exchanger where it absorbs heat from the exhaust gases of the internal combustion engine.

15 Claims, 1 Drawing Figure

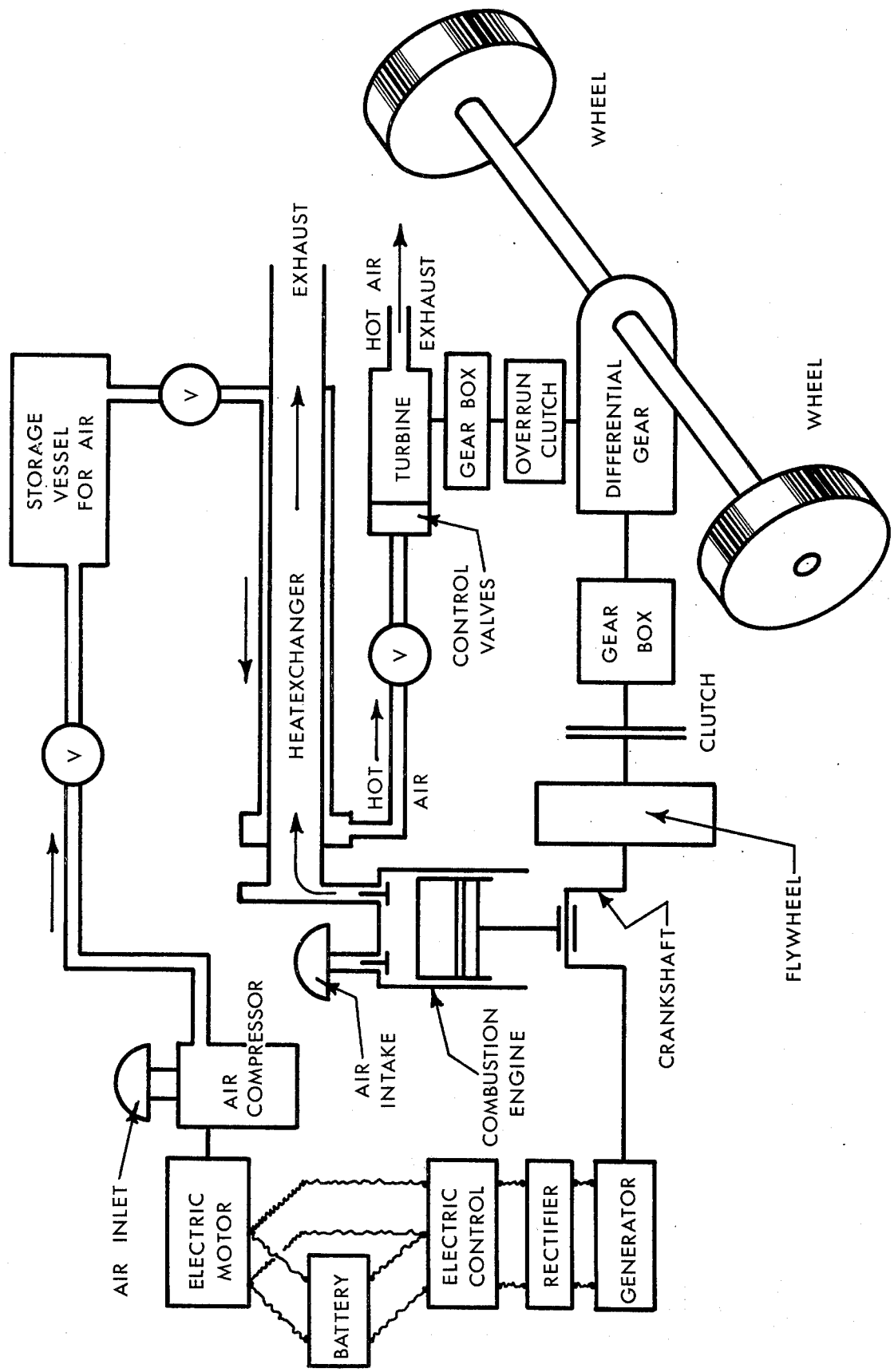

HYBRID MOTOR UNIT WITH ENERGY STORAGE

CROSS REFERENCE TO RELATED APPLICATION

This application is a continuation-in-part of my application Ser. No. 425,689, filed Dec. 17, 1973 and now abandoned.

FIELD OF THE INVENTION

This invention relates to internal combustion engine units intended pirmarily but not exclusively for automotive applications.

REVIEW OF THE PRIOR ART

The internal combustion engine is almost universally used as the prime mover for road vehicles. In general, the power output of the engine used is selected so as to provide a satisfactory rate of acceleration, since the power required for this purpose will in most cases greatly exceed that required for sustaining the vehicle at normal steady driving speeds. Additional power may also be required for climbing hills if high speeds are to be maintained. Unfortunately the characteristics of conventional internal combustion engines are not well suited to meeting these requirements. The maximum torque delivered by such an engine remains fairly constant over the normal working speed range of the enging, entailing that over a wide range of speeds output is roughly proportional to engine speed, and the torque available falls off rapidly to zero at very low speeds. Thus in accelerating a vehicle from rest, some form of slipping clutch arrangement must be used to enable the output of the engine to be coupled to the wheels of the vehicle, and even then anything approaching the full power output of the engine is not available until it has accelerated towards the upper end of its speed range. This problem is to some extent alleviated by the use of change-speed gears, but the more effective these are in making the best of the engine characteristics, the greater the energy losses occurring in them tend to be. Moreover, conventional internal combustion engines require under acceleration conditions a greater than stoichiometric fuel/air ratio in order to operate satisfactorily: this excess fuel gives rise to pollution problems which can only be overcome either by degrading the performance of the engine by reducing the fuel-air ratio or by processing the exhaust gases from the engine in some manner.

It has been proposed in U.S. Pat. Nos. 507,032 to Neukirch and 2,090,214 to Maniscalco to utilize an internal combustion engine to drive a compressor which in turn drives a compressed air motor. The use of a receiver for the compressed air enables the characteristics of the compressed air motor to be exploited to meet fluctuating power demands whilst operating the internal combustion engine under much more steady conditions. Unfortunately, the efficiency of such a system is very llow in terms of fuel use, since only a minor proportion of the energy content of the fuel is converted into kinetic energy by the internal combustion engine, and a further very large proportion of even this minor proportion is lost in the compressed air transmission systems.

Proposals have also been made in U.S. Pat. Nos. 722,116 to Lanchester and 1,013,528 to Broderick to provide an auxiliary air compression facility supplying air to a receiver for use for various auxiliary purposes, or for operating an air engine to augment the output of an internal combustion engine for starting or additional acceleration. In both cases the compressor also acts as the air engine and therefore cannot perform both functions simultaneously. Moreover, at any particular speed the power output of the air engine when supplied with air at a given pressure must be less than the power input required to compress air to that pressure, which in turn must be less than the output of the internal combustion engine; this means that only a fractional augmentation of the power output of the internal combustion engine can be provided. In all the devices so far considered, efficiency is necessarily low because piston type air engines cannot handle very hot air and their thermal efficiency is consequently low. Although Lanchester warms his air prior to admitting it to the air engine, this is merely to prevent production of frozen condensation during subsequent expansion and any gain in thermal efficiency is more than compensated for by the heat lost in cooling the compressed air before passing it to the receiver.

U.S. Pat. No. 1,813,543 to Pescara proposes the use of a gas turbine recieving air which has been heated inter alia by contact in a heat exchanger with the exhaust from a direct acting internal combustion compressor, the output of which provides the air supply for the turbine. This system is therefore akin to those of Neukirch and Maniscalco discussed above, and possesses the same disadvantages although the efficiency would be somewhat greater due to the use of a turbine, which can accept air at much higher temperature than a piston type air engine.

Various attempts have been made to utilize the gas turbine in automotive applications, but none have met with widespread acceptance, largely because its characteristics are unfamiliar and its advantages have not been sufficient to displace conventional internal combustion engines.

SUMMARY OF THE INVENTION

The present invention combines an internal combustion engine with a hot air turbine capable of substantially greater short term power output than the internal combustion engine to provide a propulsion unit offering many of the advantages of both types of engine, which can be operated more economically than a conventional internal combustion engine in the same application, and which presents fewer pollution control problems. A limited proportion of the power output of the internal combustion engine is used to operate a compressor, either directly, or indirectly, for example by means of an electric motor supplied from a storage battery charged by an engine operated generator, or in part by energy recuperated by regenerative braking of the vehicle and used to operate a compressor. The internal combustion engine need be only of such a maximum power output as is necessary to propel a vehicle to which the unit is fitted at a required maxiumum speed, whilst the turbine has a considerably larger maximum power output which is sufficient to provide a desired rate of acceleration. The output of the compressor is fed to a receiver, the capacity of which is large enough to supply air to the turbine over a period at least sufficient to accelerate the vehicle for such a period as may be necessary in normal driving. To improve efficiency and reduce the necessary capacity of the receiver, the air from the receiver is passed through a heat exchanger on its way to the turbine, the heat exchanger being heated by exhaust from the engine and preferably having substantial thermal storage capability. The turbine is controlled to operate during acceleration of the vehicle, and under hard acceleration supplies most of the output: its output can be sustained as long as the air in the reservoir lasts.

SHORT DESCRIPTION OF THE DRAWING

The drawing shows diagrammatically a power unit according to the invention as applied to a motor vehicle. Only relevant portions of the vehicle are shown. Since the individual components of the unit are in themselves well known, they are not shown in detail.

DESCRIPTION OF THE PREFERRED EMBODIMENT

The energy to drive a vehicle, of which, other than the power unit and transmission, only the rear axle and rear wheels 18 are shown, is derived from an internal combustion engine 10. The power output of this engine is selected so as to enable it to drive the vehicle at a desired maximum speed. To take an illustrative example, an engine of 18.5 KW maximum output can propel a well streamlined car of 800 kg weight including the driver at a steady speed in excess of 130 km/hour the level, which comfortably exceeds the maximum speed limits now applied in an increasing number of countries. With current technology, such a power output can readily be obtained from a single cylinder engine of 250–350 $cm^3$ capacity. Besides its small size and weight, such a single cylinder engine presents a number of other advantages. With one cylinder, no compromise is necessary in the design of valve arranagements and porting of the engine to allow for adjoining cylinders, and such features may be incorporated as charge stratification, multiple spark plugs, induction passages automatically adjusted to resonance to increase the air charge in the cylinder, and Ricardo sleeve valves or Cross or Aspin rotary valves, allowing the use of low octane gasoline and promoting efficient combustion, particularly with a cylinder of relatively small diameter (76 mm or less for the example quoted).

Moreover, it is possible to operate a single cylinder engine satisfactorily over its whole speed range using a fuel/air mixture ratio substantially less than stoichiometric. The mixture is supplied by an induction system schematically shown at 11, although it will be understood that direct or indirect fuel injection may be employed and indeed is preferred because of the more accurate control available over mixture strength. This ratio may therefore be chosen to minimize pollutants in the engine exhaust, and to achieve an exhaust mixture in which reaction will take place further to reduce pollutants. For example, by using approximately 13% surplus (depending on the design of the engine) of air in the mixture when using gasoline, CO and hydrocarbon emissions are at a low level and such CO as is present reacts in the exhaust system stoichiometrically with the NO. Such ratios are not generally feasible in a multicylinder engine, since the unevenness of performance between cylinders, which is aggravated by lean mixtures, causes excessively rough running, with detriment both to performance and engine life.

An engine operated on a lean mixture in the manner just described will not be capable of adequate accelerative performance. In a conventional engine, the mixture would be enriched for acceleration, and even then, such a small engine would provide only very moderate acceleration. In the present invention, torque for acceleration is provided by a hot air turbine 30 capable of maximum power output greater than that of the engine, usually by a factor of at least 2, and preferably 4–6. Such a turbine has a torque curve which is maximum at zero speed and falls with increasing speed, which ideally complements that of the internal combustion engine by providing torque to accelerate the vehicle and even to assist in accelerating the engine itself at just those speeds at which an internal combustion engine is least capable of so doing. The turbine may for example be of the axial or radial type having one or two stages, and for the performance required in relation to the engine 10 will need a mean turbine wheel diameter of 10 cm, operating at a maximum peripheral speed of up to 400 m/sec, when supplied with air at about 8.5 bars. Since the turbine is typically required to handle up to 120Kcal enthalpy drop per kilogram of air, a two stage turbine gives improved efficiency in the low speed range.

The turbine is connected to a final drive, for example a differential gear 16 to the wheels 18 through a gear box 46 which matches the speed range of the turbine to that of the vehicle, and an overrun clutch 47 which allows the turbine to take up drive automatically when air is supplied to it, and to remain stationary at other times. It will be apparent that alternative methods of connecting the output of the turbine into the power train of the vehicle may be employed provided that they allow smooth addition of the turbine output to that of the engine whenever air is supplied to the turbine. The engine 10 is connected to the differential 16 by means of its crankshaft 12, carrying the usual flywheel 13, a clutch 14 and a change-speed gearbox 15. The latter may generally be less elaborate than is normally necessary, since it is no longer necessary to match the characteristics of the engine to the speed of the vehicle for optimum acceleration. It is merely necessary to relate the speed of the engine to that of the vehicle so that the former can deliver torque smoothly to the wheels to maintain a desired running speed.

The air supply for the turbine is provided by a piston type compressor 34, which is shown driven by a motor 35 powered from the storage battery 36 or the alternator 37 and rectifier 42 of the vehicle and hence indirectly by the engine, from the crankshaft 12 of which the generator is driven. A unit 40 is provided to control the motor 35 in well known manner so that it only runs when necessary to maintain a desired pressure, for example 80 bars, in a storage vessel 25 receiving air from the compressor. A non-return valve 43 prevents loss of air from the vessel 25 when the compressor is not running. In an alternative arrangement, the compressor is operated directly from the engine crankshaft, in which case means is provided either to disconnect the compressor, or to relieve its load by venting its outlet to the atmosphere once the required pressure is obtained in the vessel 25. The power requirement of the compressor should be only a fraction of the maximum power output of the engine 10, and is about 2.25 KW in the example being discussed. Because of the high pressure utilized, a two or three stage compressor is preferred, and is capable of delivering about 4 grams of air/sec. to the vessel 25 at a pressure of 80 bars. The vessel 25 may typically have a volume of about 20 liters, and is heat insulated. The air from the output of the compressor is likely to have a temperature of about 200° C and for maximum efficiency it is desirable that this heat should not be lost. From the vessel 25, air is supplied as required to the turbine by means of a control valve 27 and a heat exchanger 23.

The heat exchanger receives the exhaust gases from the exhaust valve 21 of the engine 10, the air from the vessel 25 being passed through a passageway means 24 and the exhaust gases through a passage 22. The heat exchanger is shown highly diagrammatically, and in practice it is preferred that the passageway means 24 be formed by a number of long, narrow metallic tubes passing through a chamber formed by the passage 22, the structure as a whole having a substantial thermal capacity. The object of the heat exchanger is to heat the air in the tubes to a very high temperature, for example about 900° C, as it is fed to the turbine 30, and since under those conditions the rate of flow of air may be many times greater in mass than the maximmum flow of exhaust gases, which in any case will not coincide with maximum airflow, it is necessary that heat be available stored in the heat exchanger structure as well as directly from the exhaust gases. In the exemplary engine being considered, 160 tubes could be provided having an internal diameter of about 2 mm, a length of about 700 mm, and a total mass (in order to provide the desired thermal capacity) of about 10–12 kg, the passage 22 being about 80 mm in diameter. Such a heat exchanger would have capacity at atmospheric pressure of about 0.1 gram, whilst the air flow through it could reach about 150 gm/sec. The heat exchanger woulld be insulated to prevent loss of heat.

An alternative position for the air control valve(s) is shown at 32, but the location 27 is preferred because then the valve will only have to handle gases at 200° C instead of 900° C. The valve 27 acts to reduce the air from the vessel 25 to a uniform pressure of, for example, 8.5 bars, and also to shut off the air or feed it progressively to an increasing number of turbine nozzle sets 31 as increasing torque is required from the turbine. These nozzle sets may be typically 5–9 in number, and conveniently the valve operates to open successive ports admitting air to different groups of tubes in the heat exchanger 33 and thence to the different turbine nozzle sets. The valve 27 is controlled so as only to open when acceleration is required, and to an extent dependent on the acceleration required. Various known means may be used for this purpose. Thus the position of an accelerator pedal controlling a throttle valve of the engine 10 may be compared with the speed of the vehicle to produce a control signal; and/or the depression in the inlet manifold of the engine 10 may be monitored to sense the existence and extent of an acceleration demand. Numerous techniques have been evolved in connection with carburetion and fuel injection systems for sensing and measuring acceleration demands and controlling valves in response thereto, and it will be apparent that such techniques may readily be adapted to the present application.

In the exemplary engine which has been considered, the air capacity of the reservoir 25 is sufficient to operate the turbine 30 at maximum air flow for about 8 seconds, and correspondingly longer at lower rates of flow. Maximum acceleration will rarely be required, the torque available being sufficient to spin the wheels of an 800 kg car at rest on a dry road, and to accelerate it fromm 0–100 km/h in less than 7 seconds. Ample capacity is therefore available for acceleration. Once discharged, the reservoir can be recharged by compressor 34 in about 3 minutes, but full discharge should rarely occur. More rapid recharging may be provided by providing an auxiliary compressor 48 which is engaged during periods of deceleration to recuperate energy from the vehicle and utilize such energy to compress additional air for supply to the reservoir 25. Engagement of the auxiliary compressor may be achieved by means similar to those described with reference to the valve 27, but operating in the opposite sense. Such an arrangement avoids undue depletion of the air supply in reservoir 25 under stop-start driving conditions as in cities, and also provides a degree of regenerative braking to compensate for the very low braking effect of the engine 12 as compared to conventional engines of larger size. Although the auxiliary compressor is shown connected to the gear box 15, it may be connected to the vehicle wheels in any convenient manner, preferably so as to derive energy from all four wheels.

It is preferred that the gear box 15 or the clutch 14 includes a free-wheel device to prevent the engine from being over-run during deceleration. This avoids operation of the engine under conditions in which incomplete combustion and increased emission of pollutants is almost inevitable.

The storage vessel 25 and the heat-exchanger 23 are insulated, as already described, and with efficient insulation it should be possible to keep these parts warm on a day to day basis. It may however be desirable to provide an electric heater connectable to an external supply to aid in starting the vehicle from cold.

Although the overall efficiency of the hot-air turbine system is in theory considerably lower than that of a conventional internal combustion engine, its use for acceleration purposes only enables the associated engine 10 to be operated extremely economically. Moreover the air supply for the turbine recuperates a proportion of the heat which would normally be lost in the engine exhaust, and, if an auxiliary compressor 48 is provided, also recuperates a part of the energy that would otherwise be lost in braking. With a vehicle equipped with an engine according to the invention, and having the exemplary dimensions discussed, it should be possible to achieve a fuel consumption as low as 3 liters/100 km with moderate driving.

In hilly country, it may be found that the engine described will not provide sufficient power for sustained hill climbing at reasonable speeds, and under these conditions a supplementary engine may be provided for engagement only when required. This is feasible when using the present invention because such a supplementary engine will only be required for sustained power demands and the inevitable lag in starting this engine when it is required will therefore be unimportant. The supplementary engine is preferably a single cylinder engine similar to the engine 10 and coupled to the drive train of the vehicle by means of a differential. This arrangement avoids roughness due to irregularities in the output torques of the engines and retains the advantages of using single cylinder engines.

When applying the invention to large vehicles such as trucks, independent engines may be provided driving different wheels or pairs of wheels, which engines may be started as required to provide a desired hill climbing performance or additional traction.

What I claim is:

1. An engine unit comprising an internal combustion engine, an air compressor requiring a mean power input substantially less than the maximum power output of the engine, a hot-air turbine having a maximum power output substantially greater than the maximum power output of the engine, gear boxes matching the outputs of the engine and the turbine to a common load, an air receiver connected to recieve air from the compressor, means transmitting power from the engine to the compressor, valve means connected between the receiver and the turbine to deliver air from the one to the other, means to open said valve means in response to an acceleration requirement of the load, and a heat exchanger defining separate thermally contacting passages connected respectively between the receiver and the turbine and between the engine and an exhaust outlet whereby to recuperate heat from the exhaust gases of the engine and deliver it to air passing from the receiver to the turbine.

2. An engine unit according to claim 1, wherein the engine unit is provided with means to supply a fuel/air mixture having a predetermined air/fuel ratio greater than stoichiometric.

3. An engine unit according to claim 2, wherein the engine unit is provided with means to supply a gasoline-/air mixture containing approximately 13% surplus air.

4. An engine unit according to claim 1, comprising an electric motor in driving connection with the compressor, supply means comprising a storage battery and a generator in driving connection with the engine, and control means responsive to the pressure in the receiver to place the motor in connection with the supply means.

5. An engine unit according to claim 1 wherein an overrun clutch is inserted between the turbine and the load.

6. An engine unit according to claim 1 wherein the valve means is between the receiver and the heat exchanger.

7. An engine unit according to claim 1, wherein the compressor and receiver are constructed to enable the receiver to store air at a pressure much greater than that required to operate the turbine.

8. An engine unit according to claim 7, wherein the valve is disposed to supply air progressively to a plurality of nozzle sets comprised by the turbine, and to reduce the pressure of the air to that required to operate the turbine.

9. An engine unit according to claim 1, wherein the heat exchanger has a substantial thermal storage capacity.

10. An engine unit according to claim 1, wherein the receiver is heat insulated.

11. An engine unit according to claim 1, wherein the maximum power output of the turbine is at least double that of the engine.

12. An engine unit according to claim 11, wherein the maximum power outut of the turbine is 4–6 times that of the engine.

13. An engine unit according to claim 1, wherein the engine is a single cylinder engine.

14. In a motor vehicle having an internal combustion engine having an induction system and an exhaust system, driving wheels, and a drive train connecting the engine to the driving wheels and including a change speed gearbox and a final drive, the improvement wherein there is provided a hot air turbine having a maximum power output substantially greater than said engine, geared transmission means connecting said turbine to said final drive, a receiver for compressed air, means to sense an acceleration demand of the vehicle, valve means to admit air from said receiver to said turbine in response to the output of said sensing means, a heat exchanger connected between said receiver and said turbine to recuperate heat from said exhaust system and transmit it to air from said receiver, a compressor to supply air to said receiver, and electric motor in driving connection with the compressor, supply means comprising a storage battery and a generator in driving connection with the engine, and control means responsive to the pressure in the receiver to place the motor in connection with the supply means.

15. In a motor vehicle having an internal combustion engine having an induction system and an exhaust system, driving wheels, and a drive train connecting the engine to the driving wheels and including a change speed gearbox and a final drive, the improvement wherein there is provided a hot air turbine having a maximum power output substantially greater than said engine, geared transmission means connecting said turbine to said final drive, a receiver for compressed air, means to sense an acceleration demand of the vehicle, valve means to admit air from said receiver to said turbine in response to the output of said sensing means, a heat exchanger connected between said receiver and said turbine to recuperate heat from said exhaust system and transmit it to air from said receiver, primary and auxiliary compressors to supply air to said receiver, and means to transmit part of the energy from the engine to drive the primary compressor, the auxiliary compressor being in driving connection with the vehicle wheels to recuperate kinetic energy from the vehicle during deceleration of the latter.

* * * * *

UNITED STATES PATENT OFFICE
CERTIFICATE OF CORRECTION

Patent No. 3,986,575          Dated October 19, 1976

Inventor(s) Ernst Eggmann

It is certified that error appears in the above-identified patent and that said Letters Patent are hereby corrected as shown below:

Column 5, line 29, "woulld" should read -- would --.

Column 5, line 41, "33" should read -- 23 --.

Column 6, line 12, "12" should read -- 10 --.

Signed and Sealed this

*twelfth* Day of *July 1977*

[SEAL]

Attest:

RUTH C. MASON
*Attesting Officer*

C. MARSHALL DANN
*Commissioner of Patents and Trademarks*